US006072811A

United States Patent [19]
Fermann et al.

[11] Patent Number: 6,072,811
[45] Date of Patent: Jun. 6, 2000

[54] INTEGRATED PASSIVELY MODELOCKED FIBER LASERS AND METHOD FOR CONSTRUCTING THE SAME

[75] Inventors: Martin E. Fermann; Donald J. Harter, both of Ann Arbor, Mich.

[73] Assignee: Imra America, Ann Arbor, Mich.

[21] Appl. No.: 09/021,863

[22] Filed: Feb. 11, 1998

[51] Int. Cl.[7] .............................. H01S 3/113; G02B 6/34
[52] U.S. Cl. ................................... 372/11; 372/18; 372/6; 372/19; 372/69; 372/70; 372/75; 372/105; 372/106; 385/11; 385/37
[58] Field of Search ................................. 372/11, 18, 19, 372/20, 25, 6, 43, 50, 69, 70, 75, 98, 101, 102, 106, 105; 385/14, 11, 37

[56] References Cited

U.S. PATENT DOCUMENTS

| | | | |
|---|---|---|---|
| 5,436,925 | 7/1995 | Lin et al. | 372/92 |
| 5,448,579 | 9/1995 | Chang et al. | 372/6 |
| 5,469,454 | 11/1995 | Delfyett, Jr. | 372/18 |
| 5,488,620 | 1/1996 | Minden | 372/18 |
| 5,627,848 | 5/1997 | Fermann et al. | 372/18 |
| 5,652,763 | 7/1997 | Delfyett, Jr. | 372/107 |
| 5,666,373 | 9/1997 | Sharp et al. | 372/18 |
| 5,701,327 | 12/1997 | Cunningham et al. | 372/99 |
| 5,898,716 | 4/1999 | Ahn et al. | 372/6 |

OTHER PUBLICATIONS

Thomas F. Carruthers et al, vol. 21, No. 23, Optics Letters, Dec. 1, 1996 "10–GHz, 1.3–ps erbium fiber laser employing soliton pulse shortening" pp. 1927–1929.

M. Hofer, et al, vol. 16, No. 7, Optics Letters, Apr. 1, 1991, pp. 502–504, "Mode locking with cross–phase and self––phase modulation".

M. H. Ober et al, "Self–starting diode–pumped femtosecond Nd fiber laser", vol. 18, No. 18, Optics Letters, Sep. 15, 1993, pp. 1532–1534.

B.C. Barnett et al, "High–power erbium–doped fiber laser mode locked by a semiconductor saturable absorber", Optics Letters, vol. 20, No. 5, Mar. 1, 1995, pp. 471–473.

M. E. Fermann, et al, Environmentally stable Kerr–type mode–locked erbium fiber laser producing 360–fs pulses, Optics Letters, vol. 19, No. 1, Jan. 1, 1994, pp. 43–45.

L.W. Liou, et al, "Effect of frequency chirp on soliton spectral sidebands", Optics Letters, Jun. 1, 1995, vol. 20, No. 11, pp. 1286–1288.

S. Gray et al, vol. 21, No. 3, Optics Letters, Feb. 1, 1996 "Soliton Fiber laser with a hybrid saturable absorber" pp. 207–209.

E.A. De Souza et al, "Saturable Absorber Modelocked Polarisation Maintaining Erbium–Doped Fibre Laser" Electronics Letters, vol. 29, No. 5, Mar. 4, 1993, pp. 447–449.

"Bend Behaviour of Polarising Optical Fibers", Electronics Letters, vol. 19, p. 679 (1983).

(List continued on next page.)

Primary Examiner—Brian Healy
Attorney, Agent, or Firm—Sughrue, Mion, Zinn, Macpeak & Seas, PLLC

[57] ABSTRACT

Stable operation of an ultra-compact modelocked fiber laser generating short optical pulses generally without use of any non-fiber, intra-cavity polarization-manipulating elements is obtained by employing a saturable absorber coupled to one end of a highly-birefringent fiber serving as the laser cavity. Once the laser is modelocked in one of the polarization axes of the highly-birefringent fiber, the degeneracy of the polarization axis is eliminated and cw oscillation along the other polarization axis is also prevented. Without a polarization-dependent loss in the cavity, the modelocked polarization axis is indeterminate, i.e., modelocking can occur on either of the polarization axes. However, the introduction of only a small polarization dependent loss is sufficient to ensure the reliable start-up of modelocking on only the low-loss axis. Such a small polarization dependent loss can be introduced by tightly coiling the highly-birefringent fiber, which generates a higher loss along the fast axis; thus, reliable modelocked operation along the slow axis is obtained. Alternatively, single polarization operation is obtained by employing a saturable absorber with a polarization-dependent loss or by introducing polarization-manipulating elements external to the laser cavity.

63 Claims, 12 Drawing Sheets

OTHER PUBLICATIONS

E. A. Marcatili, "Bends in Optical Dielectric Guides", The Bell System Technical Journal, pp. 2102–2133, Sep. 1969.

"Single–Polarisation Operation of Highly Birefringent Bow–tie Optical Fibres", Electronics Letters, vol. 19, p. 246 (1983).

"Ultralow threshold current 780–nm vertical–cavity surface–emitting lasers with oxide current aperture" CLEO '96, Tuesday, pp. 208–209.

E.J. Greer et al, "Polarisation dependent gain in erbium––doped fibre amplifiers" Electronics Letters, vol. 30, 1994, p. 46.

W.H. Loh et al, "Passively Mode–Locked $ER^{3+}$ Fiber Laser using a Semiconductor Nonlinear Mirror", IEEE Photonics Technology Letters, vol. 5, No. 1, Jan. 1993.

"1–2 ps Pulses from Passively Mode Locked Laser Diode Pumped Er–Doped Fibre Ring Laser", Electronics Letters, vol. 27, No. 19, Sep. 12, 1991, pp. 1734–1735.

M. Hofer et al, Monolithic Polarization–Insensitive Passively Mode–Locked Fiber Laser, OFC'96 Technical Digest, Tuesday.

S.Tsuda et al, "Broadband Compace Mode–Locked Er/Yb Fiber Laser", CLEO'96 p. 494.

An Aluminum–Wire Grid Polarizer Fabricated Onto a Gallium Arsenide Photodiode, CLEO '97 pp. 23–24.

INTEGRATED PASSIVELY MODELOCKED FIBER LASERS AND METHOD FOR CONSTRUCTING THE SAME

BACKGROUND OF THE INVENTION

1. Field of the Invention

The present invention relates to integrated passively modelocked fiber lasers and methods for constructing integrated passively modelocked fiber lasers. In particular, the present invention relates to a low-cost, high-reliability, passively-modelocked fiber laser constructed without non-fiber internal polarization manipulating elements.

2. Description of the Related Art

Techniques for generating short and ultrashort optical pulses in optical fiber lasers have been known for a number of years and have been used in many applications. In general, short pulses in fiber lasers are produced using one of the following techniques: active mode-locking, as described by Carruthers et al., Optics Letters, Vol. 21, p. 1927 (1996); passive-modelocking using saturable absorbers, as described by Ober et al., Optics Letters, Vol. 18, p. 1532 (1993); passive modelocking relying on Kerr-type nonlinearities, as described by M. Hofer et al., Optics Letters, Vol. 16, p. 502 (1991); or a combination of these three techniques. Passive modelocking using saturable absorbers is the simplest approach and is most amenable to the manufacturing of ultra-compact devices, as required when using short-pulse fiber lasers in OEM (original equipment manufacture)-type mass applications.

In the context of passive modelocking using saturable absorbers, ultra-low-cost, highly reliable fiber lasers with as few as possible optical components are highly desirable. While ultra-low-cost fiber lasers (such as those described by: Zirngibl et al., Electronics Letters, Vol. 27, p. 1734 (1991); Lin et al., U.S. Pat. No. 5,436,925 (1995); Barnett et al., Optics Letters, Vol. 20, p. 471 (1995); Hofer et al., Optical Society of America Conf. on Optical Fiber Communication, OFC 1996 paper TuB3 (1996); Loh et al., IEEE Photonics Technology Letters, Vol. 5, No. 1 (1993); Cunningham et al., U.S. Pat. No. 5,701,327; Minden, U.S. Pat. No. 5,488,620 and Tsuda et al., Conf. on Lasers and Electro-Optics, paper CFD2, p. 494 (1996)) as well as highly reliable fiber lasers (such as those described by DeSouza et al., Electronics Letters, Vol. 29, p. 447 (1993) and Fermann et al., Optics Letters, Vol. 19, p. 43 (1994)) and Fermann et al., U.S. Pat. No. 5,627,848 have indeed been manufactured, fiber laser designs that combine these two features have not been developed to date.

Ultra-low cost fiber lasers can, for example, be constructed by using a saturable absorber in a fiber ring cavity as described in Zirngibl et al. and Lin et al. cited above. These two references use low-birefringence fiber to form the cavity, which leads to inherent stability problems due to polarization drifts in the cavity.

Alternatively, ultra-low cost fiber lasers can be constructed by using a saturable absorber as an end mirror in a Fabry-Perot-type cavity as described in the above cited work by Barnett et al., Hofer et al., Tsuda et al., Loh et al., Cunningham et al. and Minden, and by Sharp et al. in U.S. Pat. No. 5,666,373. The Fabry-Perot cavities are all quite similar as they are also constructed with low-birefringence fiber with the same stability problems as the two ring cavities described above. Only in the work by Minden et al. is the stability problem not an issue since the object there is to generate a pseudo-random pulse train. In contrast, most applications of mode-locked pulses require a very stable pulse train void of any time-dependent (or long-term) changes in the polarization output state that are inherent to the use of low-birefringence intra-cavity fiber. The early work in this area dates to the publication by Loh et al. in 1993, which illustrates the essential elements of an integrated passively mode-locked fiber laser. Fermann et al '848 also suggested low-cost cavity designs, albeit with bulk polarizers or paddle-wheel polarization controllers. In particular Fermann et al '848 suggested the use of cladding-pumped fiber and the use of a partially reflecting saturable absorber for output coupling. The additions by Sharp et al and Cunningham et al specifically only relate to the exact design of the saturable absorber. The addition by Sharp et al relates more specifically to a saturable absorber formed integrally as a low reflector mirror. This possibility was also discussed by Fermann et al '848, albeit not specifically for Tm-doped fiber. Equally, semiconductor processing techniques also allow low reflectivity saturable absorbers mirrors that are not formed (or grown) directly on mirror structures. None of the above references, however, address the fact that the use of low-birefringence fiber leads to an inherent polarization stability problem in such lasers.

Of course the intra-cavity polarization state in Fabry-Perot or ring cavities can be controlled by the use of fiber paddle wheel polarization controllers. However, such polarization controllers are also inherently unstable and should be avoided. Polarization controllers as used in mode-locked lasers can serve a variety of functions. In the presence of a polarization-dependent loss, polarization controllers adjust the intra-cavity loss to a level where mode-locking by a saturable absorber is stable. Further, though the polarization state of the light of a reciprocal Fabry-Perot laser is linear at each end of the cavity, the direction of the polarization direction is undetermined and controlled by intra-cavity polarization controllers.

The most subtle requirement for intra-cavity polarization controllers in the presence of low-birefringence fiber is the fact that the internal round-trip phase-delay between the light propagating along the two eigenstates of polarization inside the fiber cavity needs to be adjusted to be close to $2\pi$ to obtain stable mode-locking with a fixed polarization state. Unless the phase delay is close to $2\pi$, the light along the two intra-cavity polarization directions can beat inside the cavity producing a highly undesirable, time-varying, inherently noisy polarization output (as reported by Hofer et al., OFC 1996, paper TuB3). For example, if the linear phase delay between the two polarization eigenmodes in the cavity is $2\pi$, the output polarization switches between two orthogonal polarization states in each round trip, as it takes two round trips to reproduce the original polarization state in the cavity. The polarization beating problem is particularly significant in the femtosecond regime, as the pulses are very short and pulses propagating along the two eigenmodes of the cavity separate from each other very rapidly. In the picosecond regime the pulses stay together much longer and should therefore be less sensitive to polarization beating.

While the linear phase delay between the polarization eigenmodes can be adjusted to be close to $2\pi$ by using polarization controllers (which will tend to lock the eigenmodes in phase), such a control is not easily incorporated in a pre-determinate fashion (as required for the mass-production of such devices). Moreover, any temperature and pressure variation will lead to a change in the linear phase delay and the direction of the output polarization; thus the whole system also requires continuous and sophisticated stabilization schemes.

On the other hand highly reliable fiber lasers have been constructed by resorting to highly birefringent fiber as reported by Fermann et al. (1994), DeSouza et al., Electron. Lett., vol., 29, p. 447, 1993, and Fermann et al. U.S. Pat. No. 5,627,848. In these particular systems a single polarization mode is selected by employing bulk polarizing elements as disclosed by Fermann et al., such as bulk polarizing elements in conjunction with bulk polarization controllers, or simply bulk polarizing elements as disclosed by DeSouza et al. However, whereas no continuously controllable polarization stabilization schemes are required in these cavity designs, the use of bulk-optic polarization-manipulating elements greatly increases the complexity of these systems and their manufacturing cost.

Therefore, to minimize the manufacturing cost of modelocked fiber lasers, bulk polarization-controlling elements or paddle-wheel fiber-type polarization controllers need to be eliminated from the cavity.

SUMMARY OF THE INVENTION

It is an object of the present invention to provide a passively modelocked fiber laser having both low cost and high reliability.

It is another object of the present invention to avoid the use of non-fiber polarization control elements and bulk-optic polarization manipulating elements within the cavity of a passively modelocked fiber laser.

It is a further object of the present invention to provide a cavity design that allows stable operation of a modelocked laser along a single polarization axis.

It is yet another object of the present invention to ensure that a particular one of the polarization axes in a fiber laser is modelocked without use of bulk-optic, intra-cavity polarization-manipulating elements.

The aforesaid objects are achieved individually and in combination, and it is not intended that the present invention be construed as requiring two or more of the objects to be combined unless expressly required by the claims attached hereto.

In accordance with the present invention, these objects are achieved in a passively modelocked fiber laser having a novel cavity design that allows stable operation in a single polarization state without any polarization-manipulating elements whatsoever, albeit with the polarization being fixed in one of two equally-probable states. In order to ensure that only one polarization state modelocks at a time, a highly birefringent erbium-doped optical fiber is used in conjunction with a saturable absorber. Once one polarization axis is modelocked, the saturable absorber ensures that the loss along that polarization axis is minimized, and cw oscillation along the other polarization axis is thereby suppressed. Simultaneous modelocking on both axes is avoided due to gain saturation and the long carrier lifetime of the saturable absorber. However, the modelocked polarization axis is not predetermined, since no intra-cavity or extra-cavity elements favor one axis over the other.

As a number of applications of modelocked fiber lasers are indeed sensitive to the polarization state of the pulses, according to the present invention, a number of novel cavity designs can be employed to ensure that the modelocked fiber laser operates reliably in a single, determinable polarization state. However, to preserve a low-cost system, the use of bulk intra-cavity polarization-manipulating elements is avoided. One polarization axis is favored over the other by bending of the highly birefringent fiber, by cleaving the fiber along one polarization axis or by using polarization control external to the main cavity. According to one embodiment, a polarization-dependent feedback can be used for this purpose. Alternatively, a polarization sensitive saturable absorber can be used to produce reliable mode-locking along a single polarization axis.

In an exemplary embodiment, a passively modelocked fiber laser is constructed from highly-birefringent erbium-doped fiber. The modelocked laser of the present invention is capable of achieving 300 fsec near-bandwidth-limited pulses with an average power of 300 $\mu$W at a repetition rate of 50 MHZ.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
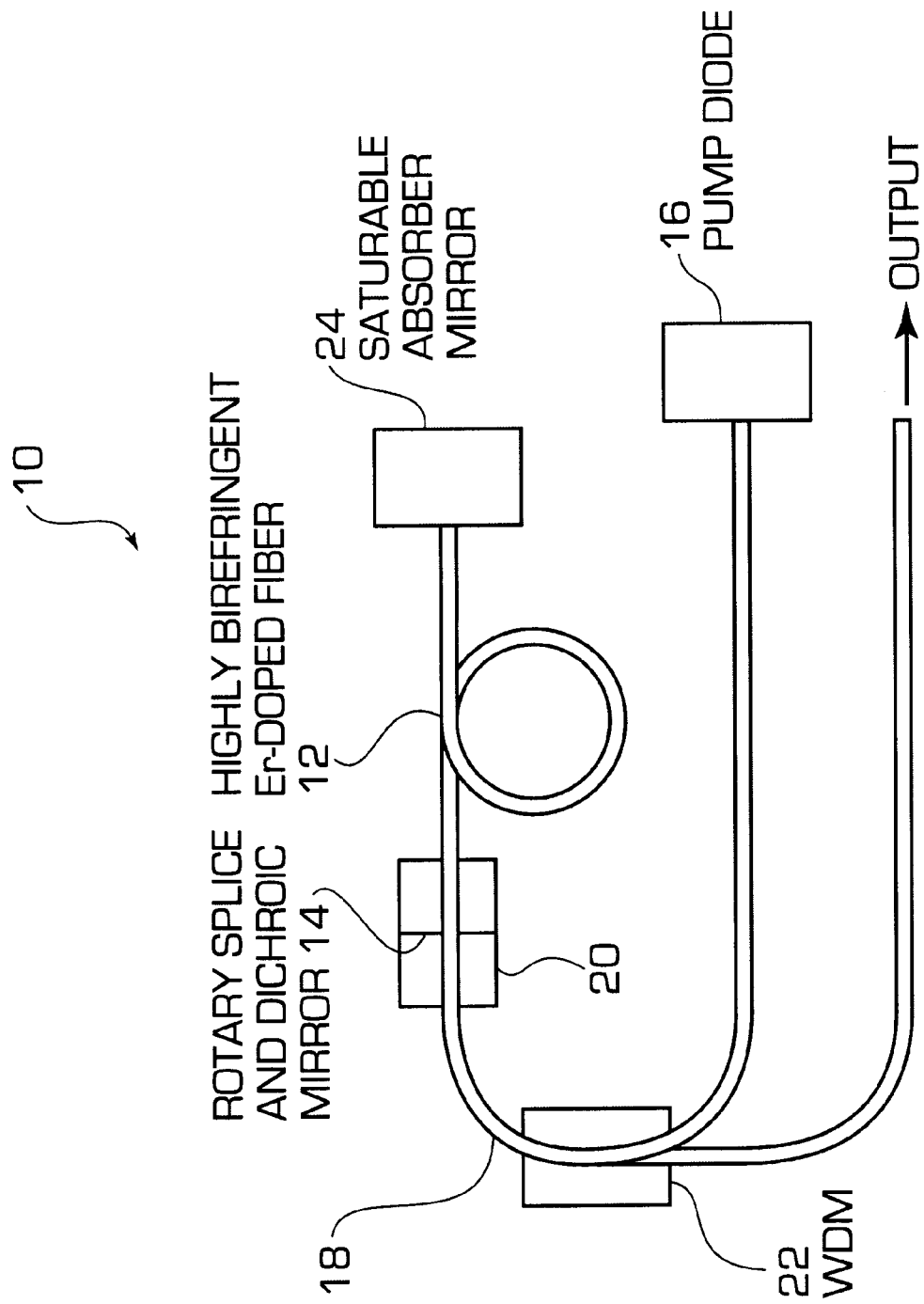
FIG. 1 is a diagrammatic view of a passively modelocked fiber laser system according to a first embodiment of the present invention.

FIG. 1 is a diagrammatic view of a passively modelocked fiber laser system 10 according to a first embodiment of the present invention. As shown in FIG. 1, the system includes a highly-birefringent optical fiber 12, i.e., an optical fiber having a birefringence greater than $1.0 \times 10^{-5}$. By way of example only, the highly birefringent fiber 12 can be a 2 meter length of highly birefringent $Er^{3+}$-doped optical fiber with a birefringence (index difference between the slow axis and the fast axis) of $\approx 4 \times 10^{-4}$, giving rise to a beat-length of $\approx 4$ mm at a wavelength of 1.55 µm. The Er-doping concentration is, for example, about 0.018% by weight. In this example, the fiber 12 has a cut-off wavelength of 1300 nm, a numerical aperture NA=0.20, and a dispersion of $\approx -10.000$ $fsec^2/m$. The mode-field diameter of the fiber can be $\approx 7$ µm.

Preferably, a portion of the fiber 12 is wound on a drum. For the above-described exemplary 2 m fiber, about 1.5 m of the Er-doped fiber is preferably wound on a drum having a diameter between approximately 12.5 mm and 10 cm (bend radius ≦5 cm).

At one end, the Er-doped fiber 12 is coated directly with a dichroic mirror 14 with a reflectivity of 70% at the signal wavelength (1.55–1.60 µm) and a transmissivity of >80% at the pump wavelength of 980 nm. The fiber 12 is pumped with a pigtailed single-mode laser diode 16, which is coupled to the fiber 12 through a pigtail 18 via a rotary splice 20. The rotary splice 20 also serves to couple the signal light out of the fiber laser, where an external wavelength-division multiplexing (WDM) coupler 22 for 980/1550 nm is used to separate the pump from the signal wavelength. That is, the WDM coupler 22 is disposed in the pigtail 18 between the laser diode 16 and the rotary splice 20, and the signal light entering the pigtail 18 from the fiber 12 through dichroic mirror 14 is separated from the pump signal by WDM coupler 22 and directed to an output, as shown in FIG. 1. Alternatively, the pigtail 18 can be coupled to the fiber 12 via a glued splice or a fused splice.

In this embodiment, the diode laser pigtail 18 is not polarization preserving; thus, external polarization controllers (not shown) must be employed in order to extract the signal light in a predetermined polarization state. However, since the pigtail 18 can be very short, any polarization drift in the pigtail 18 is minimal. Alternatively, the entire pigtail 18 can be made from polarization maintaining fiber, with the WDM coupler 22 also being polarization-maintaining.

At the other end of the highly birefringent fiber 12 is a semiconductor saturable absorber mirror 24. The fiber can be butted and glued (using UV-curable index-matched epoxy) to the semiconductor saturable absorber mirror 24. The saturable absorber mirror 24 can have, for example, a low-power reflectivity of >80% and a carrier life-time of 10 psec. Alternatively, the end of Er-fiber 12 can be AR-coated and glued into a glass capillary (not shown). In turn, the glass capillary is then glued to the saturable absorber mirror 24, such that a small gap is left between the fiber end and the saturable absorber mirror 24. The gap is preferably less than 1 mm. Since the semiconductor surface is very fragile, it is preferable to prevent any direct contact between the fiber end and the saturable absorber 24 to maximize the life-time of the absorber. The semiconductor can be, for example, InGaAsP with a band edge of 1.56 µm. Preferably, the saturable absorber mirror has a band edge within ±100 nm of the wavelength of the output signal energy.

Alternatively, the saturable absorber mirror can be attached to the fiber 12 using a lift-off technique.

In experiments conducted using the laser system shown in FIG. 1, it was observed that, for large bend-radii (>2 cm), cw oscillation occurs along both axes of the fiber 12 near the laser threshold, with equal power in both axes. However, at a pump power of approximately 20 mW, the laser began modelocking spontaneously along only one polarization axis (hereinafter the ML (modelocked) axis), and cw oscillations along the other polarization axis stopped. Along the axis which was not modelocked (hereinafter the DW (dispersive wave) axis), the formation of a dispersive wave was observed. Importantly, the ML axis was not predetermined, i.e., when the pump laser was switched on several times, modelocked operation along either one of the two polarization axes was observed, with a random distribution between the two axes.

Figure 2:
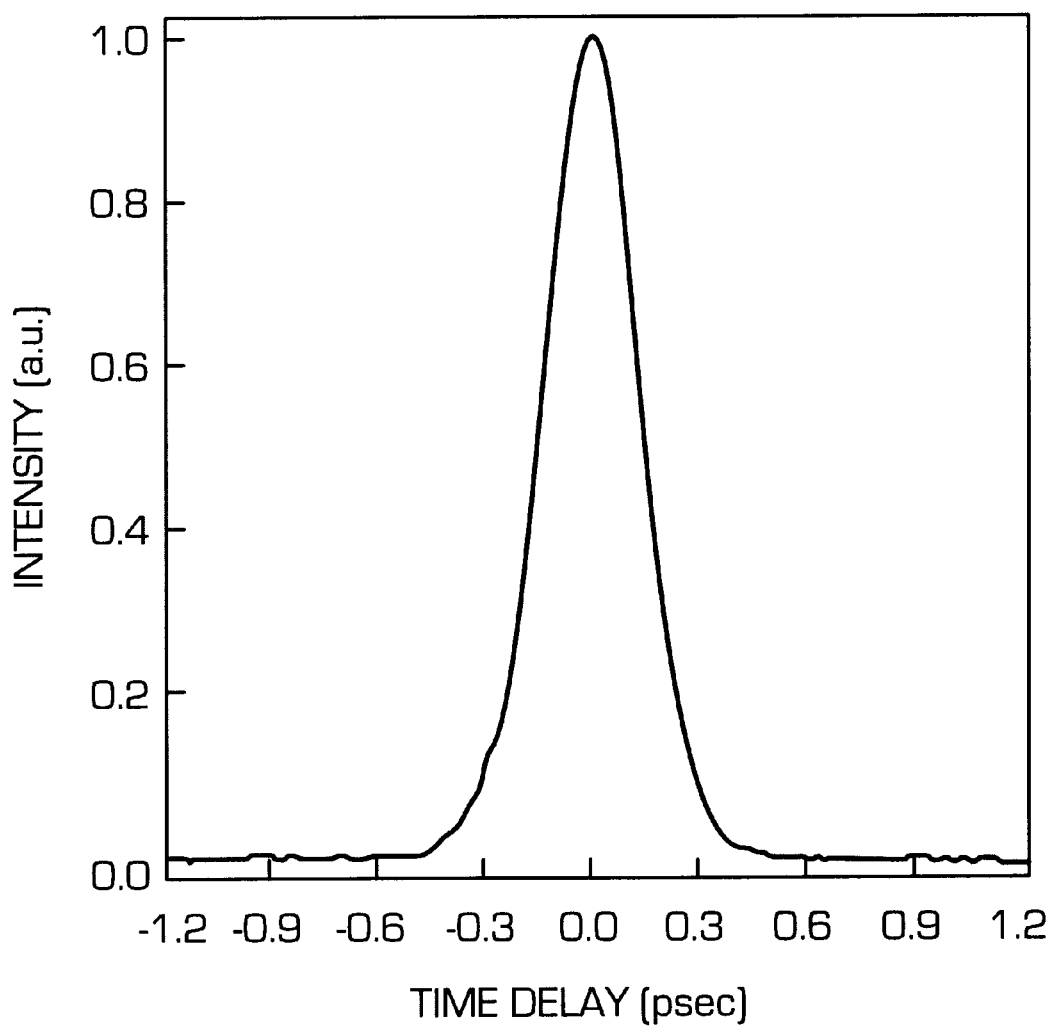
FIG. 2 is a graph illustrating a typical autocorrelation of the pulses obtained along the modelocked axis of the modelocked laser of the present invention.
Figure 3:
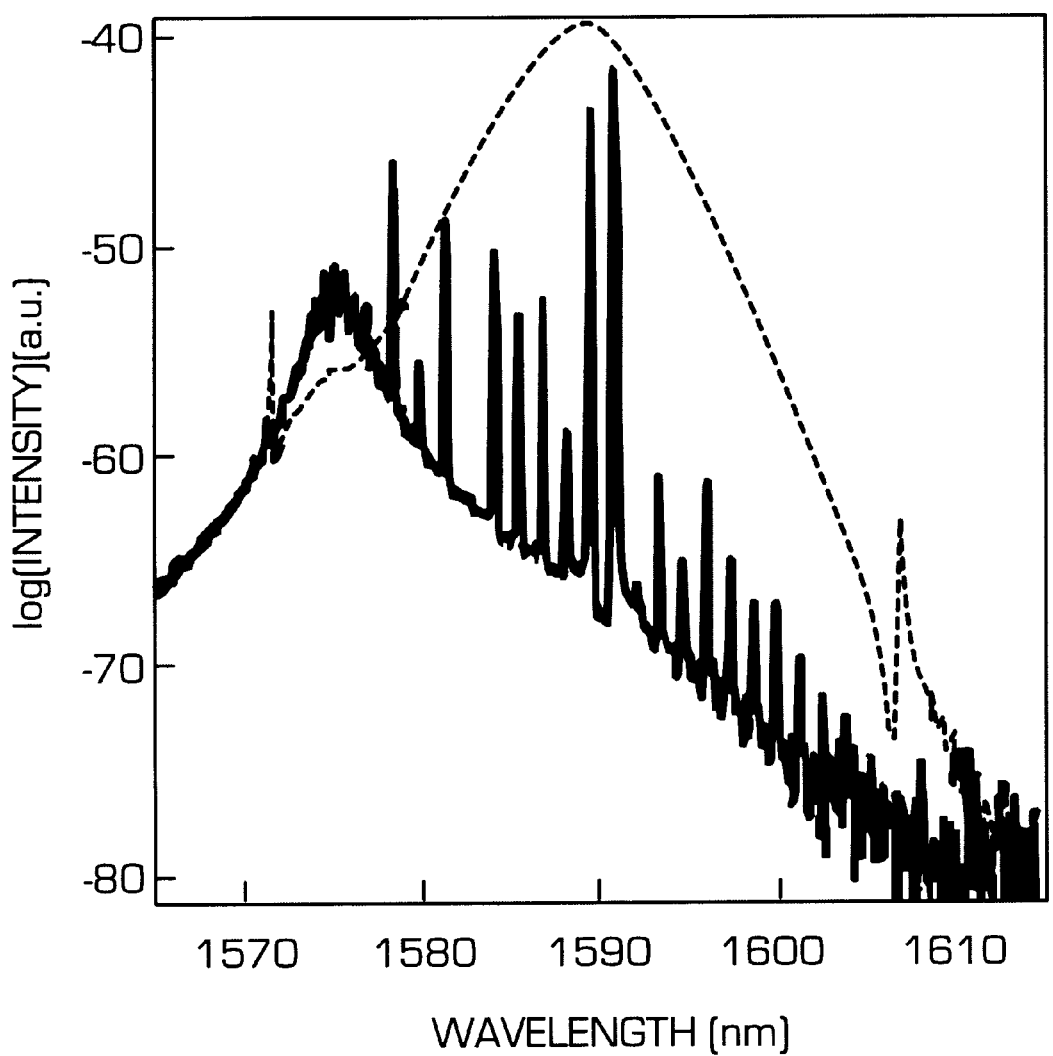
FIG. 3 is a graph illustrating the pulse spectrum along the modelocked axis and along the dispersive wave axis of the modelocked laser of the present invention.

It was observed that the pulses had a repetition rate of 50 MHZ (determined by the employed fiber length), where a maximum average output power of 0.5 mW was obtainable. A typical autocorrelation of the pulses obtained along the ML axis is shown in FIG. 2. A typical FWHM pulse width of 300 fsec (assuming a $sech^2$ pulse shape) was generated. The corresponding pulse spectrum along the ML axis is shown in FIG. 3. The FWHM spectral width was typically 7.5 nm, giving a time-bandwidth product of 0.27, which is close to the time-bandwidth limit of 0.31 for a $sech^2$-shaped pulse, and indicates that the generated pulses closely resembled solitons.

The spectrum under modelocked operation along the DW axis is also shown in FIG. 3. It can clearly be seen in FIG. 3 that the total power along the DW axis is very much lower than the total power along the ML axis. The spectrum along the DW axis consists of both an amplified spontaneous emission (ASE) part, with a peak at 1.580 µm, and a number of sharp, uniformly-spaced resonances, which are attributable to a dispersive wave along the DW axis that couples coherently with the soliton. A condition for the spacing of these resonances can be derived simply by considering the phase-matching condition for energy transfer between the soliton and the orthogonal dispersive wave. For energy transfer to occur, the round-trip phase delay between the soliton and the dispersive wave must be a multiple of $2\pi$, as explained in Liou et al., Optical Letters 20, 1286 (1995). Expanding the phase along the ML axis and the DW axis to first order frequency, the condition for the frequency spacing δv of the resonances can be derived as:

$$\delta v = \frac{c}{\delta n L},$$

where δn is the birefringence of the fiber, L is the round-trip cavity length and c is the velocity of light. With a birefringence of $\delta n \approx 4 \times 10^{-4}$, a frequency spacing δv=190 Ghz is thus obtained, which corresponds very well to the observed frequency spacing of δv=160 Ghz. Note that two small resonances associated with dispersive-wave coupling of a dispersive wave along the ML axis are also visible in FIG. 3.

The reason the laser modelocks along only one polarization axis may be explained from gain competition between the two fiber axes, arising from gain-saturation and the long carrier lifetime of the saturable absorber, which inhibits the formation of pulses along the DW axis of the fiber laser. Once the laser is modelocked along one axis, however, the loss along that axis is lower; therefore, cw oscillation along the DW axis is suppressed, apart from the coexistence of unavoidable ASE and the dispersive wave component that is in an orthogonal polarization state relative to the soliton.

It was found experimentally that lasing reliably starts along only one polarization axis for fiber having a beat-length of <10 cm. At beat-lengths of 10 cm and longer, the two polarization eigenmodes in the fiber can couple nonlinearly, i.e., vector solitons can be formed, leading to complex and irreproducible operational characteristics of the laser.

In the laser system according to the first embodiment of the present invention, modelocking is initiated on either one of the polarization axes of the fiber without any particular preference. For systems where the polarization state of the laser is critical, this uncertainty can be avoided simply by using a polarizer, aligned at 45°, with respect to the eigen-axes of the fiber, external to the oscillator. In this arrangement, 50% of the signal light in the polarization axis of the polarizer is transmitted, independent of the polarization state of the laser. However, the repetition rate of the laser would still be one of two possible values.

To eliminate the degeneracy of the two polarization eigen-axes, some additional means must be used. The simplest solution is to coil the highly birefringent fiber onto a small drum, which leads to a loss differential along the two polarization axes, since the slow axis of a highly birefringent fiber has a higher refractive index and is therefore more strongly guided, as described by Varnham et al., Electronics Letters, Vol. 19, p. 679 (1983). Note that this is a very attractive method, since the polarizer self-aligns with the fiber axes. Since the loss differential that is required to induce the laser to start up only in one polarization direction is very small, this technique does not require any special fiber designs and control of the coiling diameter, and it is therefore very easily implemented. Indeed, it was found that, when using a coiling diameter of 12.5 mm, the start up of modelocking in one determinate polarization axis was obtained with 100% certainty. The loss differential between the two polarization eigenmodes in this case was carefully measured at 1 dB and is very much lower (and much more easily attainable) than the extinction values of up to 30 dB used in coiled, highly-birefringent fiber polarizers.

Typically, in the absence of internal stresses in the fiber, the polarization-dependent bending loss is small. This is particularly true for weakly guiding fibers, i.e., fibers where the difference between the refractive index of the core $n_{co}$ and the refractive index of the cladding $n_{cl}$ is small $n_{co}/n_{cl}-1 \ll 1$, even where the fiber core is elliptical (or rectangular), as reported by Marcatili in The Bell System Technical Journal, p. 2103 (September 1969). Thus, an appreciable polarization-dependant loss is preferably introduced by using fibers with large internal stresses, such as those described in the above-referenced article by Varnham et al.

The foregoing Er-doped fiber laser design has been described only by way of example; similar performance can be obtained by incorporating any other rare-earth-doped, highly birefringent fiber and saturable absorbers with appropriately selected carrier life times, saturation energies and band edges. Such fibers include those doped with: Er, Yb, Er/Yb, Nd, Pr, Ho or Tm.

Figure 4:
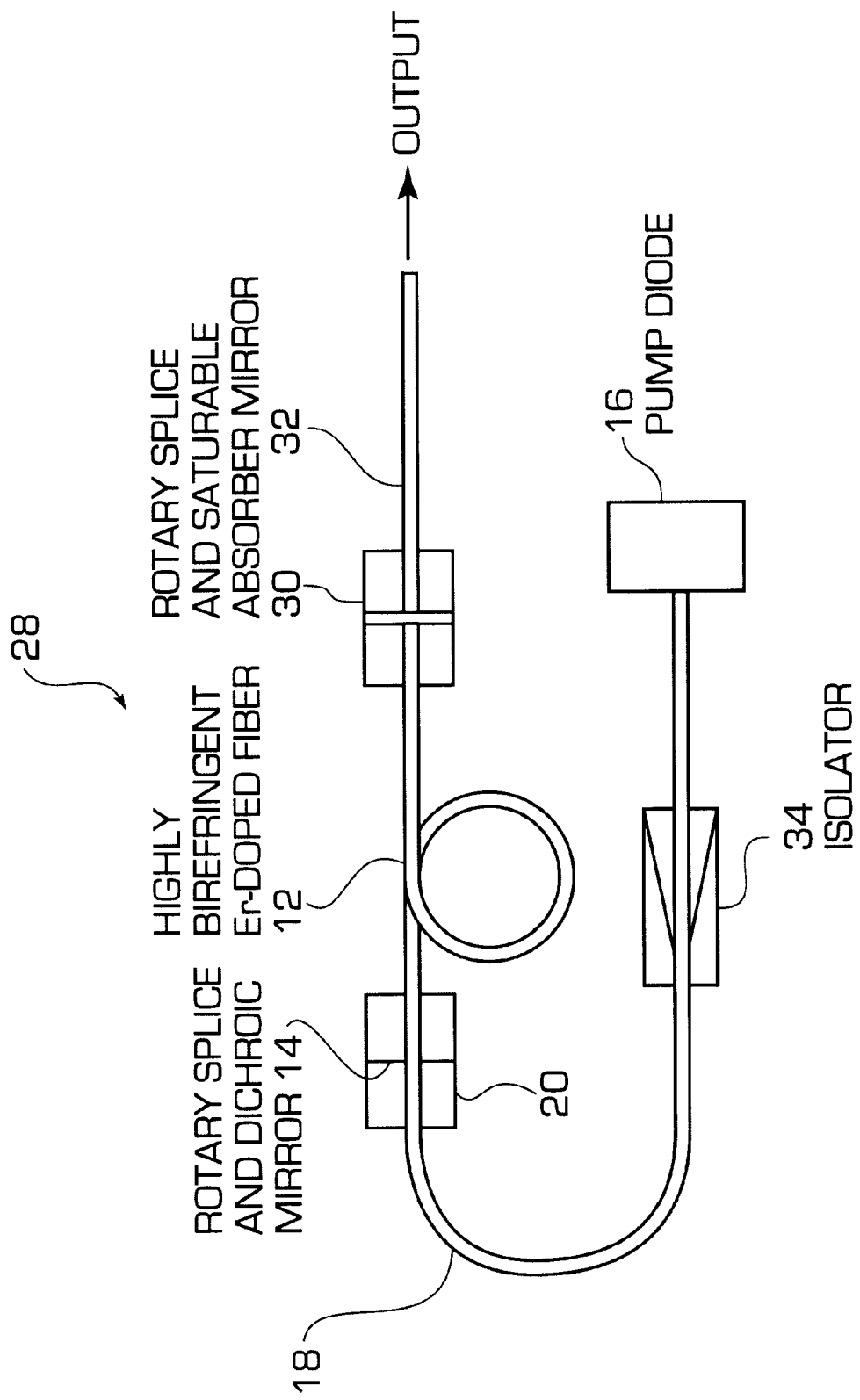
FIG. 4 is a diagrammatic view of a passively modelocked fiber laser system having a cavity design employing a partially reflecting saturable absorber according to a second embodiment of the present invention.

FIG. 4 illustrates a passively modelocked fiber laser system 28 having a cavity design according to a second embodiment of the present invention. As shown in FIG. 4, a partially reflecting saturable absorber 30 is disposed at one end of the cavity, and the fiber output is taken at the saturable absorber end, where another rotary splice is used to connect a fiber pigtail 32 for output coupling. The fiber pigtail 32 can be polarization maintaining, and the polarization axes of the intra-cavity fiber and the pigtail can be aligned to obtain a predetermined linear polarization output at the end of the pigtail 32. An optional isolator 34 for the pump laser 16 can be used to prevent noise from unwanted feedback into the pump laser 16. Such an isolator can be used with any of the cavity designs described herein.

In FIG. 4, the partially reflecting absorber can be an absorber formed directly on a mirror structure or the absorber and the mirror can be made separately. For example the saturable absorber can be attached to a dielectric mirror or the fiber end face by a lift-off technique. Alternatively, a wafer bonding technique can be applied to fuse separate wafers, one containing the absorber and one containing the mirror.

Further, it has been shown (e.g., in the above-referenced article by Varnham et al.) that the polarizing behavior of bent optical fibers can be optimized by coherent bending, i.e., by controlling the orientation of the fiber axis with respect to the bend. In this case, a particular polarizing behavior can also be obtained in fibers with cm-order beatlengths. Coherent bending is particularly straight-forward with D-shaped or rectangular fibers. To increase the polarization dependent loss, it is also advantageous to introduce large internal stresses into the fibers. Such internal stresses can, for example, be introduced by incorporating glasses with different thermal expansion coefficients into the fibers, as discussed in the above-referenced article by Varnham. However, because of the asymmetric structure of a D-shaped fiber, some internal stress is present even without the incorporation of separate stress-producing glasses. The need for bending of the fiber can be eliminated by using fiber which guides only one polarization state, as described by Varnham et al. in Electronics Letters, Vol. 19, p. 246 (1983).

Figure 5:
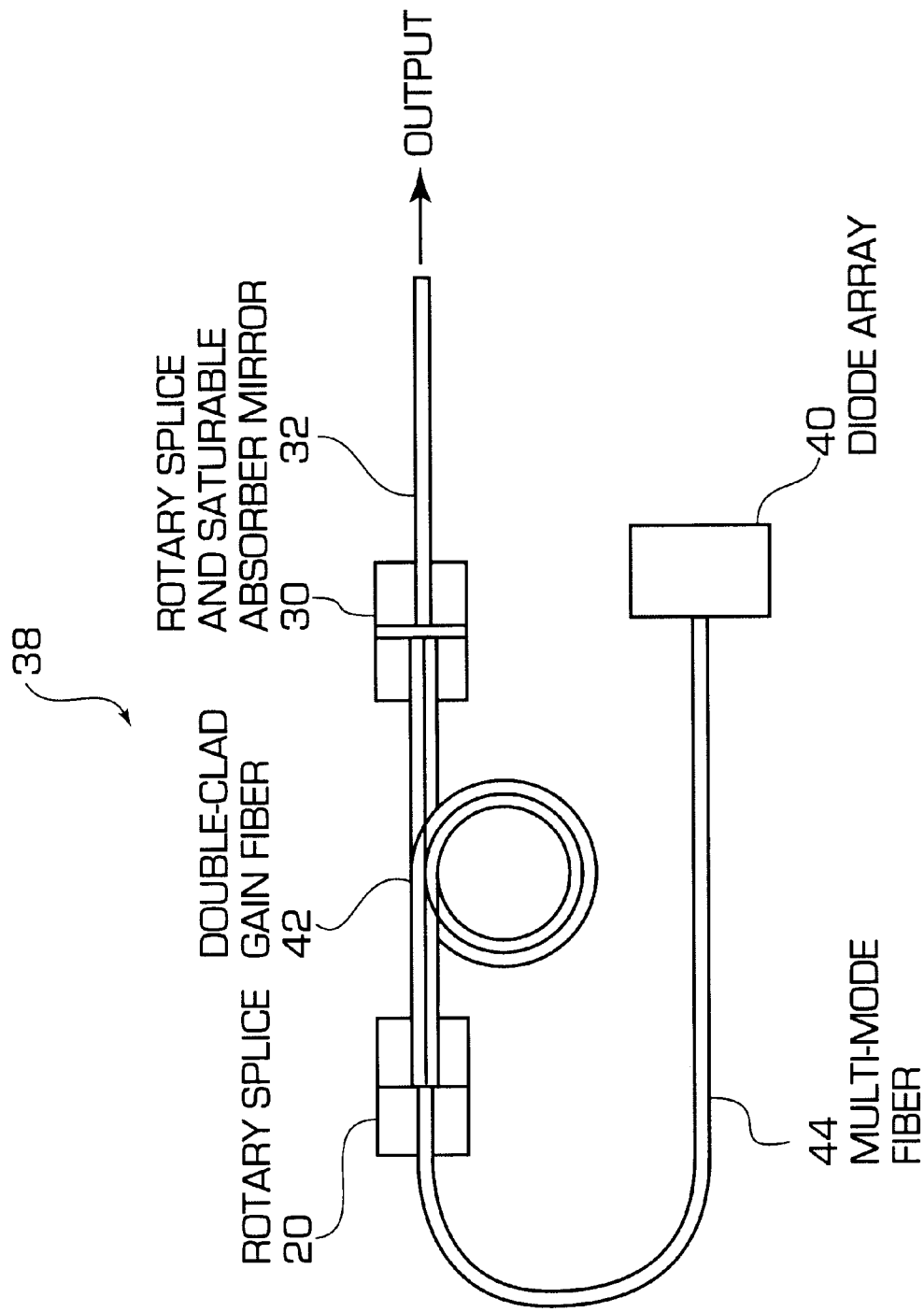
FIG. 5 is a diagrammatic view of a passively modelocked fiber laser system having a cavity design employing a double-clad fiber in accordance with a third embodiment of the present invention.

FIG. 5 illustrates another laser system 38 having a cavity design in accordance with the third embodiment of the present invention. As shown in FIG. 5, to facilitate pumping with a broad-area diode laser 40, a birefringent double-clad fiber 42 can be employed. Like the fiber 12 shown in FIG. 1, such a double-clad fiber can also be pumped through a dichroic pump mirror 14; however, the output of the fiber laser is then most easily extracted through a partially transmitting saturable absorber. Note, however, that the pigtail 44 that contains the pump-light can also be double clad. In this case, the output can also be extracted in a manner similar to that shown in FIG. 1. The WDM, however, then must be designed to operate on the single-mode portion of the double-clad pigtail pump fiber 44, which will typically lead to a loss of at least approximately 50% for the multi-mode part of that type of coupler. A further advantage of broad-area diode lasers is that they are less sensitive to feedback and, in general, an isolator for the pump light is not required.

Figure 6:
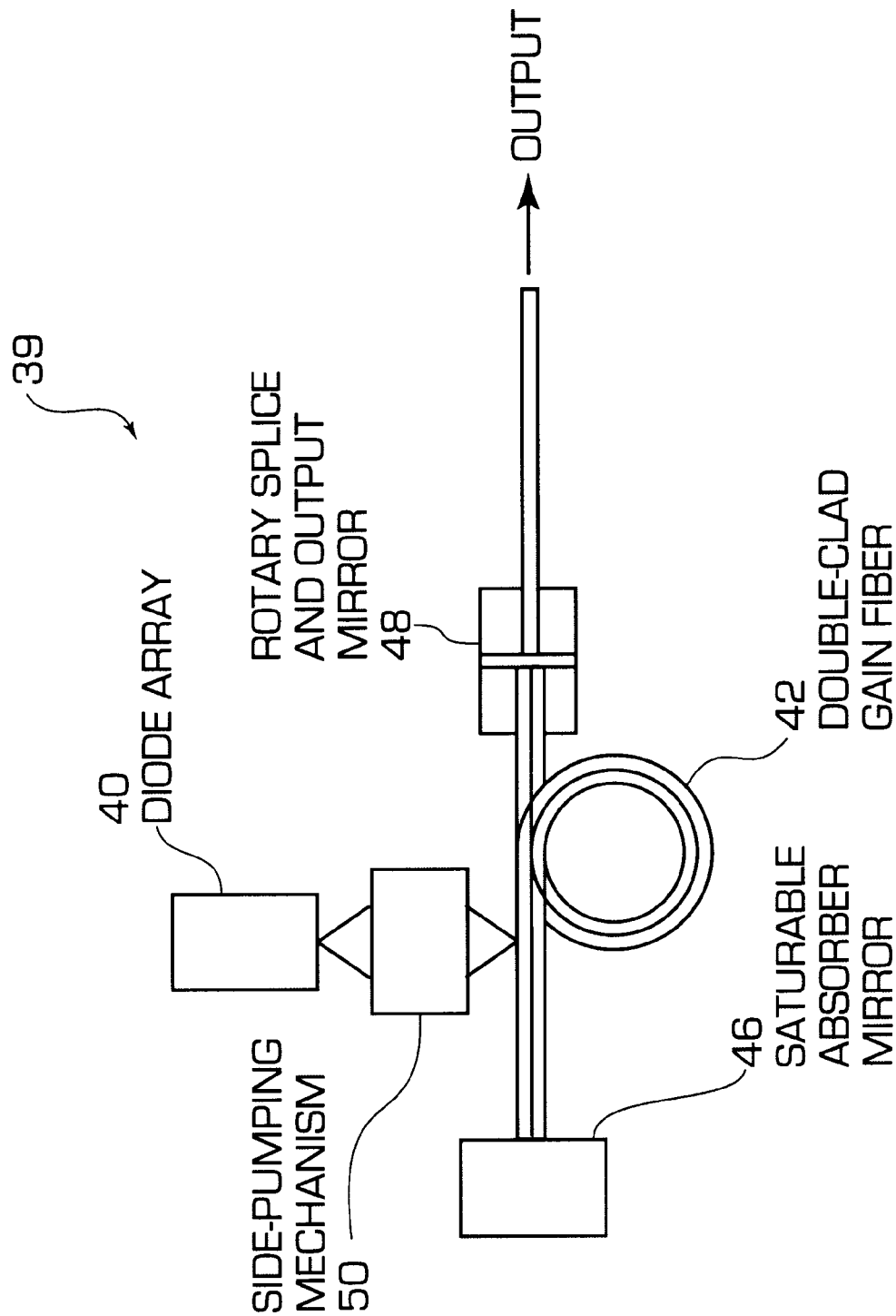
FIG. 6 is a diagrammatic view of a passively modelocked fiber laser system having a side-pumped, double-clad fiber configuration according to a fourth embodiment of the present invention.

FIG. 6 illustrates yet another laser system 39 having a cavity design according to a fourth embodiment of the present invention. As shown in FIG. 6, a particularly straight-forward design results from incorporation of a side-pumped double-clad fiber pumped with a side-pumping mechanism 50. In this case, a totally reflecting saturable absorber mirror 46 can be used, and the output can be extracted from a partially reflecting mirror 48 at a rotary splice at the other end of the fiber cavity. Side pumping is particularly attractive with a V-groove technique, as described by Goldberg et al., Conf. on Lasers and Electro-Optics, paper CtuU1, p. 208 (1996), or by simply using a prism, as described by Snitzer et al. in U.S. Pat. No. 4,815,079 (1989). However, any method of side-pumping into a double clad fiber is acceptable. In some situations, it may be desirable to introduce an additional weakly polarizing element into systems using the side-pumping arrangement.

The degeneracy of the polarization axes in double-clad fibers can of course also be eliminated by tightly bending the fiber, particularly in the presence of large internal stresses inside the fiber.

Figure 7:
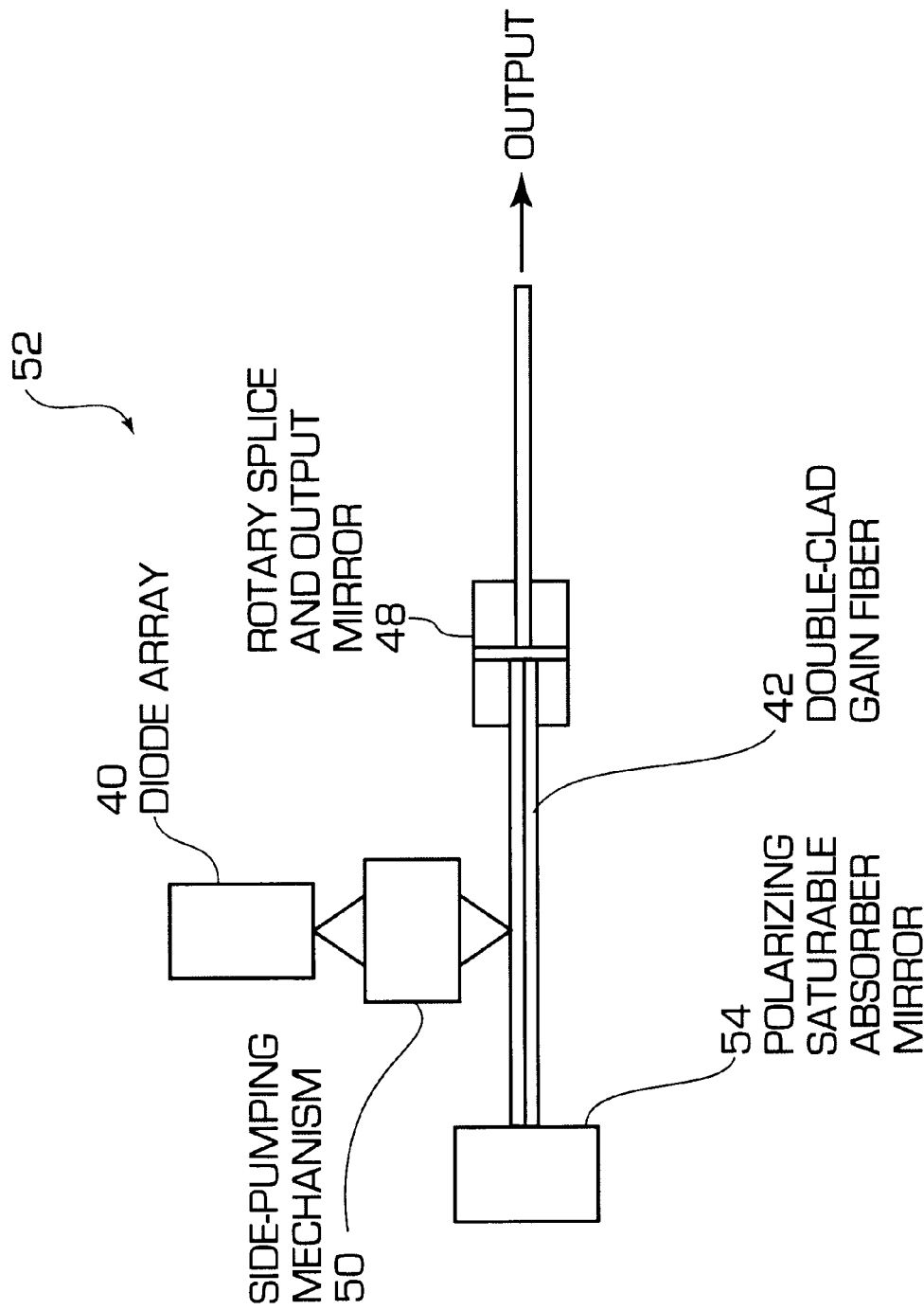
FIG. 7 is a diagrammatic view of a passively modelocked fiber laser system employing an integrated polarizer according to a fifth embodiment of the present invention.

As an alternative to tight bending, a single polarization axis can be selected in an integrated system by using a semiconductor saturable absorber with an integrated polarizer. FIG. 7 illustrates a laser system 52 employing such an integrated polarizer according to a fifth embodiment of the present invention. As shown in FIG. 7, a polarizer can be integrated into a semiconductor saturable absorber mirror 54 by depositing a wire grid on the surface of the semiconductor. Since only a small loss discrimination between the polarization eignemodes is necessary, a relatively large grid spacing can be selected. A semiconductor with a grid polarizer is described by Domuki et al., Conf. on Lasers and Electro-Optics, 23, paper CME7 (1997). Optimum performance of the system is obtained by aligning the grid polarizer of the saturable absorber 54 with one of the polarization axes of the oscillator fiber 42. A semiconductor saturable absorber with a grid polarizer can, of course, be used in any type of integrated passively mode-locked laser described herein. As a 1 dB difference in polarization loss is sufficient to obtain polarization discrimination, the grid polarizer need not be of good quality.

The degeneracy of the polarization axes in the cavity can also be lifted by using polarization-dependent hole burning. The polarization of the pump light can be aligned with one of the axes of the gain fiber to produce a polarization-dependent gain via polarization hole burning, as described by Greer et al., Electronics Letters, Vol. 30, p. 46 (1994). The configuration of the laser is similar to that shown in FIG. 4, where the polarization of the pigtail containing the pump light is aligned with one of the polarization axes of the oscillator fiber.

Figure 8:
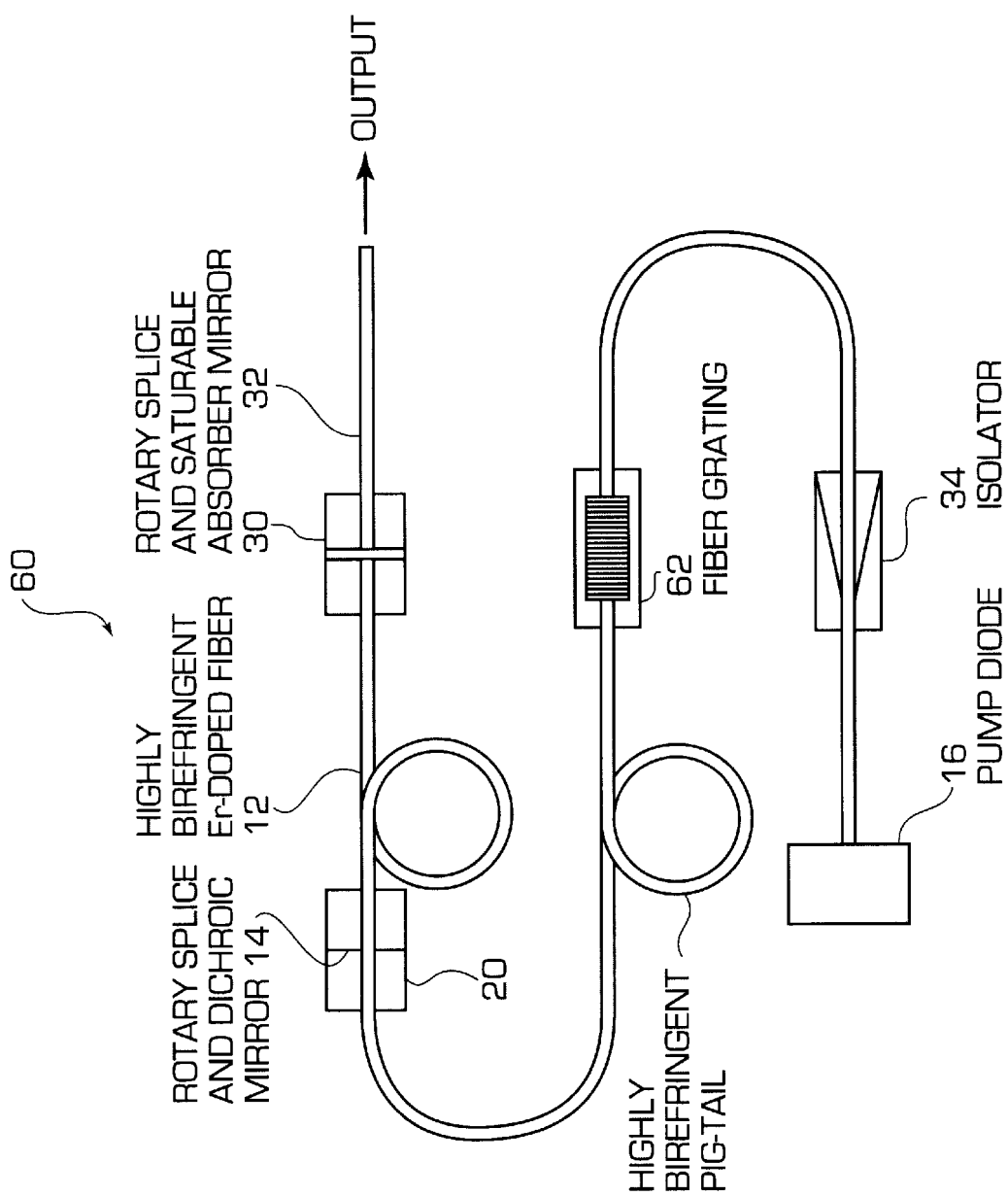
FIG. 8 is a diagrammatic view of a passively modelocked fiber laser system employing a fiber grating external to the laser cavity according to a sixth embodiment of the present invention.

FIG. 8 is a diagrammatic view of a passively modelocked fiber laser system 60 according to a sixth embodiment of the present invention. Laser system 60 illustrates another alternative for achieving single-polarization operation, wherein a small, polarization-dependent feedback is incorporated external to the laser cavity. Specifically, a fiber grating 62 is used to produce a small amount of feedback, where a tightly-coiled, highly-birefringent fiber (or the pigtail) acts as an integrated polarizer. However, it is equally acceptable to employ any other type of external polarizer and other reflecting surfaces instead of the fiber grating.

Furthermore, the intra-cavity fiber can be mounted on a piezoelectric coil, which can be modulated to simplify the start-up of the laser and which can be used to control the cavity length of the laser with an appropriate electronic feedback circuit.

Figure 9:
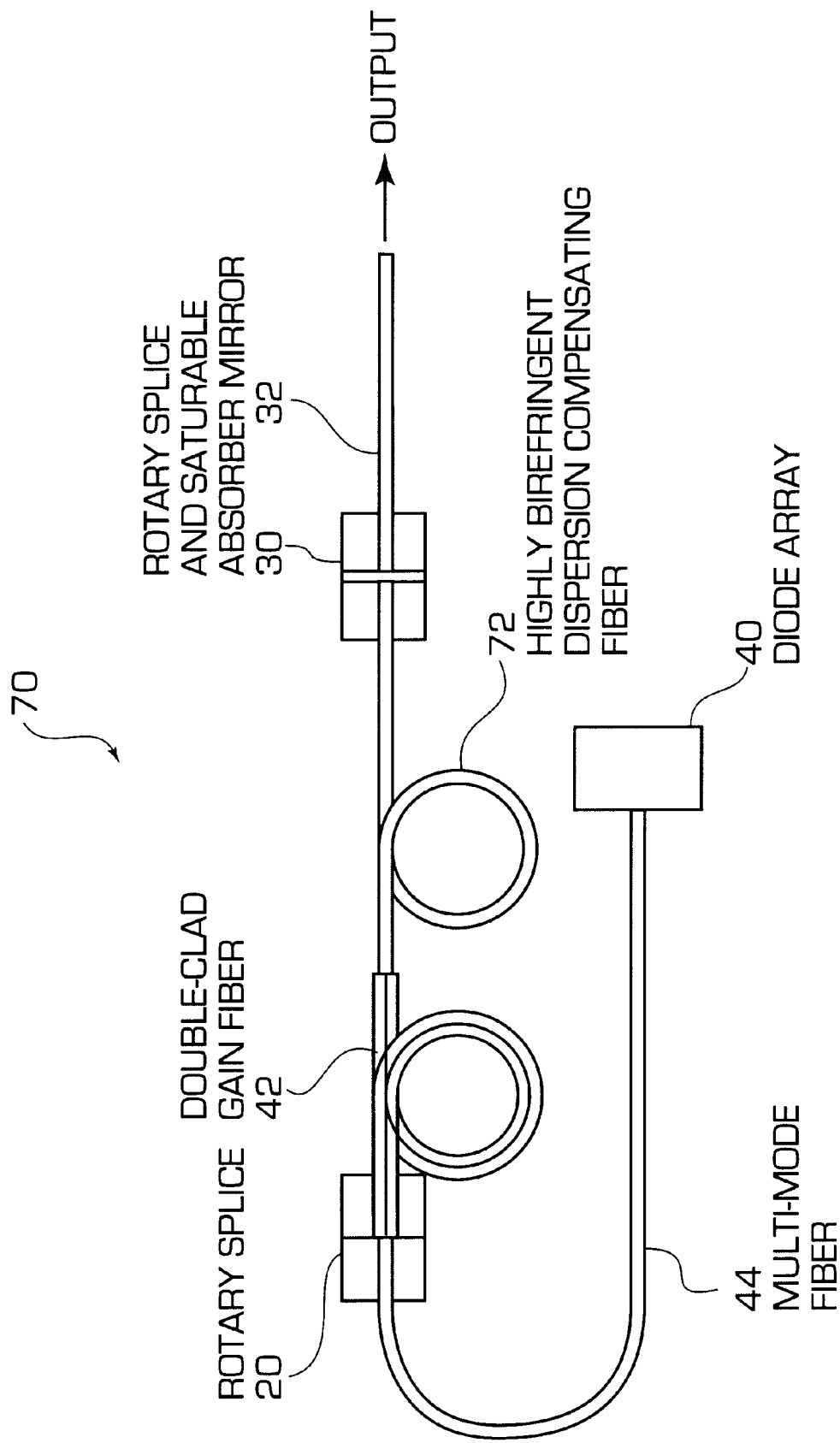
FIG. 9 is a diagrammatic view of a passively modelocked fiber laser system having multiple, different fibers within the laser cavity according to a seventh embodiment of the present invention.

FIG. 9 is a diagrammatic view of a passively modelocked fiber laser system 70 according to a seventh embodiment of the present invention. The laser system 70 is similar to laser system 38 shown in FIG. 5. However, rather than using a single gain fiber, several different fibers are spliced together with their polarization axes aligned. For example, as shown in FIG. 9, the cavity can comprise a double-clad fiber 42 and a highly birefringent dispersion compensating fiber 72. The degeneracy of the fiber axes can be lifted by bending either one of these fibers. In particular, by using fibers with different amounts of dispersion, near-zero dispersion cavities or cavities with large amounts of positive or negative dispersion can be constructed to control the pulse width, pulse energy and repetition rate of the laser. Further, to control the spot size of the laser-mode on the saturable absorber, highly birefringent fibers with appropriately selected mode-field diameters can be used in front of the saturable absorber. Alternatively, the fiber at one cavity end can be tapered to produce a large mode-field diameter to maximize the damage threshold of the saturable absorber. The distance between the tapered end of the intra-cavity fiber and the saturable absorber mirror preferably is not greater than 10 cm.

Figure 10:
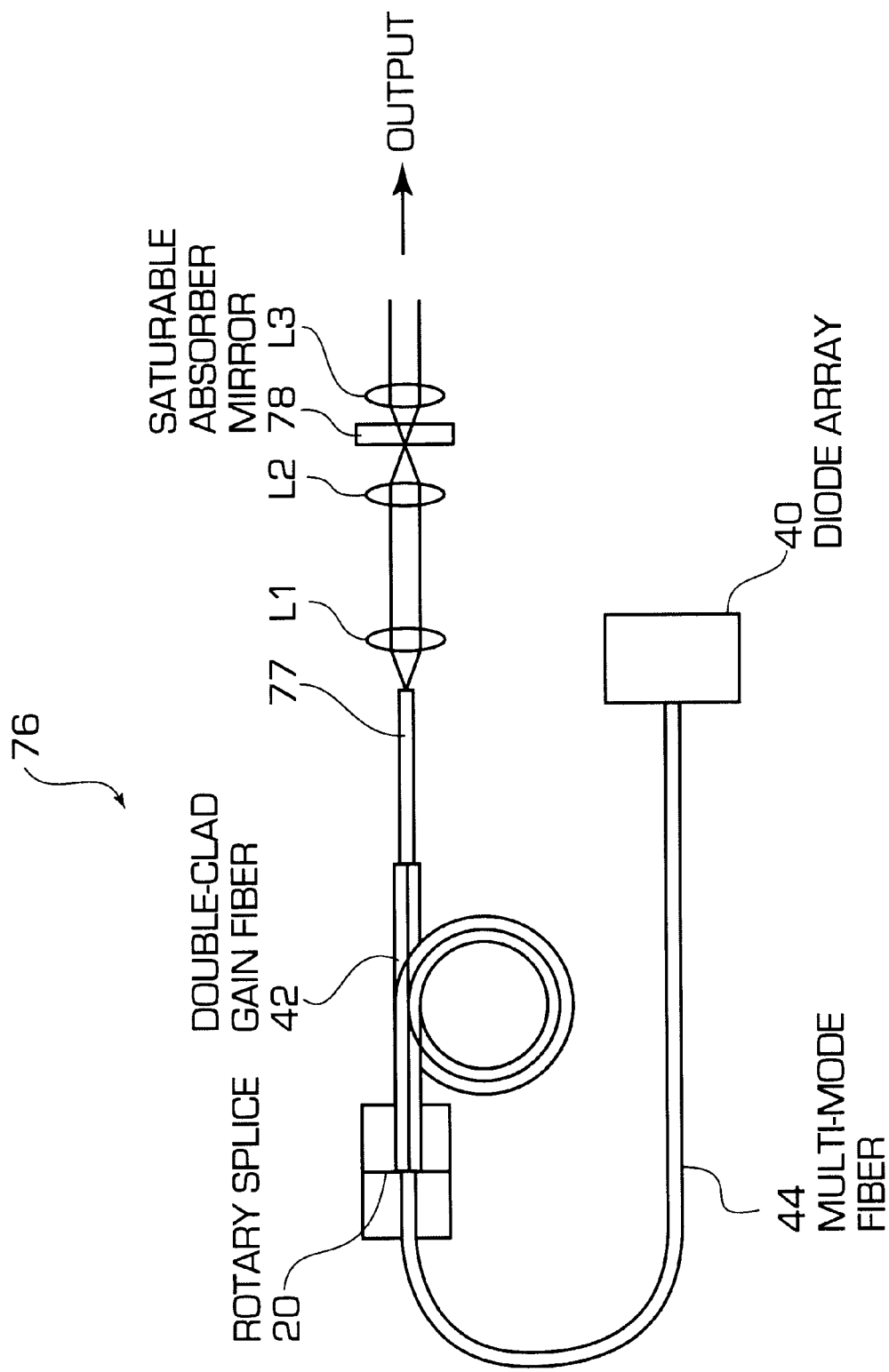
FIG. 10 is a diagrammatic view of a passively modelocked fiber laser system employing lees to control the light spot size on the saturable absorber according to an eighth embodiment of the present invention.

FIG. 10 illustrates a passively modelocked fiber laser system 76 according to an eighth embodiment of the present invention. As shown in FIG. 10, a serial arrangement of two lenses L1 and L2 can be used to control the spot-size of the signal light from fiber 77 on saturable absorber 78. A third lens L3 couples the signal light transmitted through the saturable absorber 78 to the output. In this arrangement, any polarization-dependent loss can be avoided by using an anti-reflection-coated fiber end on fiber 77. Note that, since no polarization-manipulation means are necessary in the free-space section of the cavity, a very compact design can still be obtained.

Alternatively, to produce a small polarization-dependent loss, the fiber end on fiber 77 can be free of AR-coating and cleaved at a large angle, where the cleave angle is aligned with one of the two polarization axes of the fiber. Such a cavity design can also be used in conjunction with side-pumping, which leaves open the additional option such that the output coupler can be removed from the saturable absorber, providing greater design flexibility. With the output end and the saturable absorber end of the cavity separated, the dielectric mirror could be grown directly onto the end of the fiber and used as an output coupler.

Figure 11:
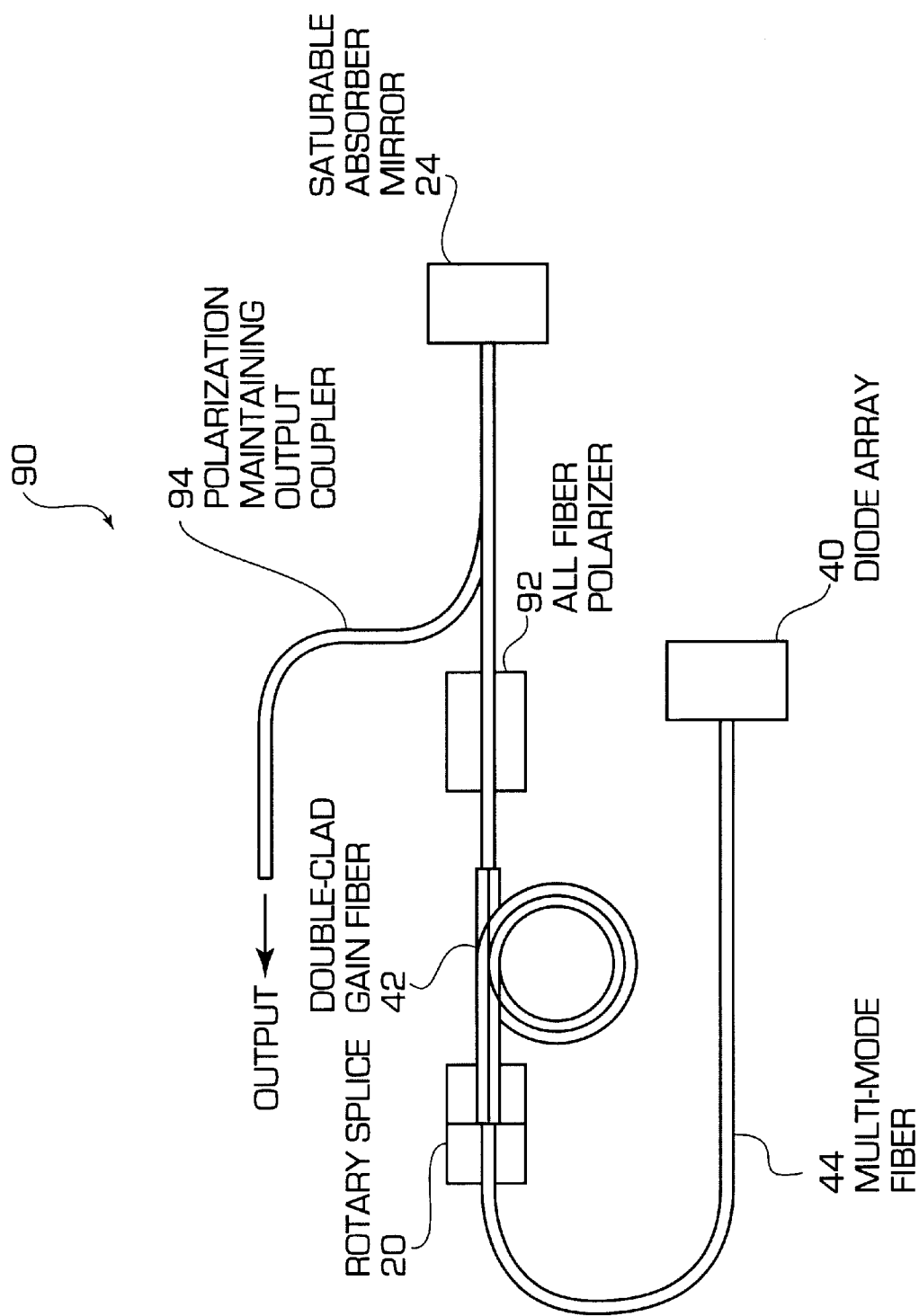
FIG. 11 is a diagrammatic view of a passively modelocked fiber laser system including an all-fiber polarizer within the laser cavity according to a ninth embodiment of the present invention.

FIG. 11 illustrates a passively modelocked fiber laser system 90 according to a ninth embodiment of the present invention. As shown in FIG. 11, once several different fibers are used, any all-fiber pigtailed polarizer 92 can be spliced (with the polarization axes aligned) into the cavity. For example a D-fiber can be polished down close to the core, and a metal film can be deposited in order to increase the polarization dependent loss. In particular, such an all-fiber polarizer 92 can also be spliced to a double-clad fiber, as shown in FIG. 11. In addition to using an output coupling at either end of the cavity, a polarization-maintaining fiber coupler 94 can be spliced (with the polarization axes aligned) anywhere into the cavity to provide output coupling, as also shown in FIG. 11.

Passive, high-harmonic modelocking can also be obtained in these cavities by using saturable absorbers with carrier life-times approximately one order of magnitude shorter than the cavity round trip time and by raising the pump power. As the soliton power in the cavity is self-limiting, raising the pump power will lead to the generation of multiple pulses in the cavity, which self-stabilize due to long-range soliton repulsion forces induced, for example, by phase modulation in the saturable absorber, as described by Gray et al., Optics Letters, Vol. 21, p. 207 (1996). Essentially, any of the cavity designs described herein can be used for passive harmonic modelocking.

Figure 12:
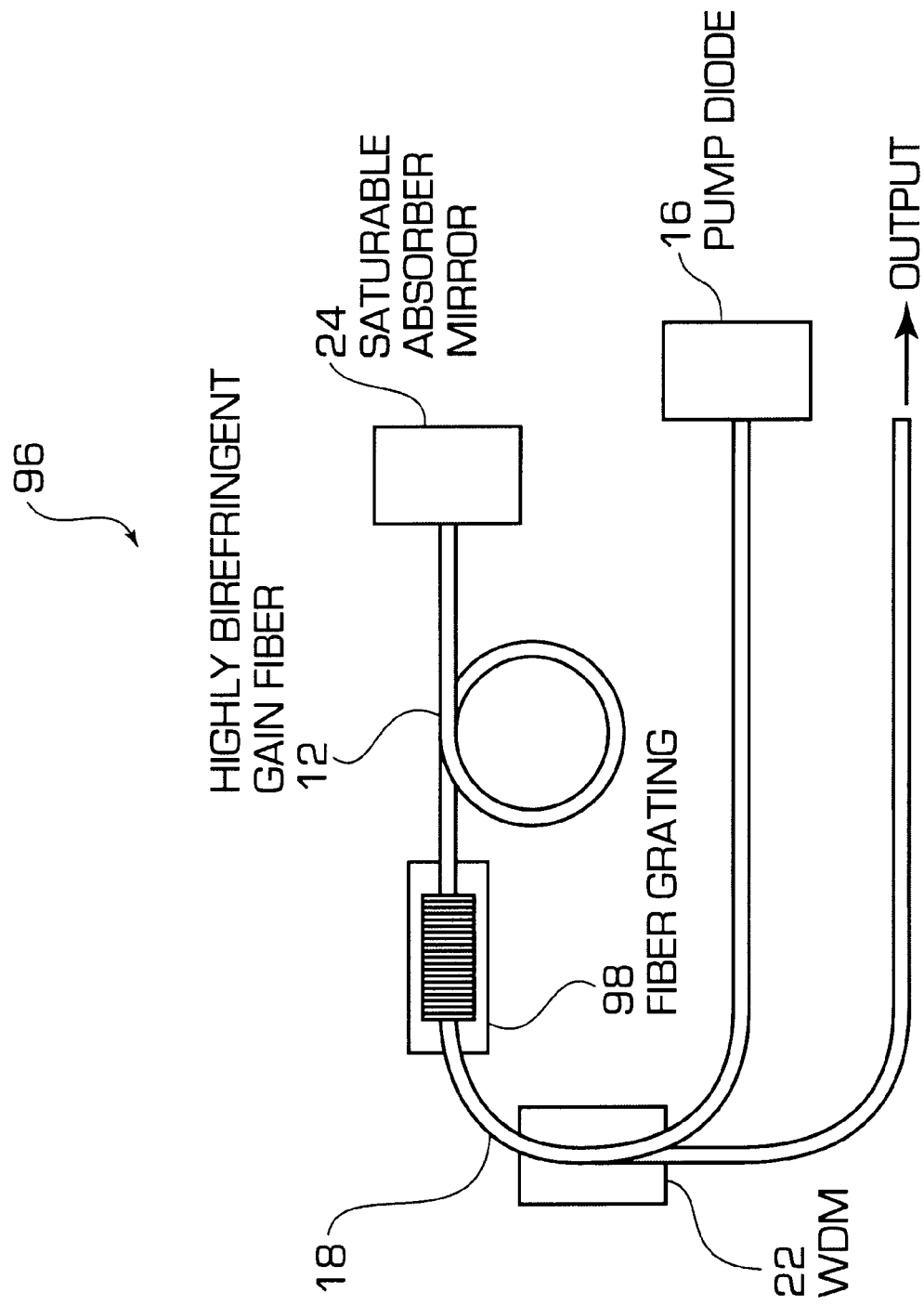
FIG. 12 is a diagrammatic view of a passively modelocked fiber laser system having a fiber grating at one end of the laser cavity according to a tenth embodiment of the present invention.

FIG. 12 illustrates a passively modelocked fiber laser system 96 according to a tenth embodiment of the present invention. As shown in FIG. 12, a chirped or unchirped fiber grating 98 can be written directly into the highly-birefringent fiber 12 for dispersion control of the cavity and also to facilitate pump power coupling and signal output coupling. Again, a fiber grating as a cavity end mirror can be used with any of the cavity designs described herein. To control the dispersion in the cavity, fibers of different amounts of dispersion can also be spliced into the cavity. To produce fiber lasers operating at low repetition rates, these dispersion-setting fibers can have lengths of hundreds of meters. The fiber grating can also be designed to be polarization sensitive to produce a polarization-dependent loss, and to ensure the production of pulses along one well-defined polarization axis.

Having described preferred embodiments of a new and improved modelocked fiber laser, it is believed that other modifications, variations and changes will be suggested to those skilled in the art in view of the teachings set forth herein. It is therefore to be understood that all such variations, modifications and changes are believed to fall within the scope of the present invention as defined by the appended claims.

All of the patents and articles referred to in this application are incorporated herein by reference in their entirety.

What is claimed is:

1. A modelocked fiber laser, comprising:
   a pump laser for generating laser energy at a pump wavelength;
   a highly-birefringent fiber gain medium having first and second polarization axes and having first and second ends which respectively define first and second ends of a laser cavity for amplifying the laser energy at a signal wavelength;
   a reflector coupled to the first end of said laser cavity, for reflecting the laser energy through said highly-birefringent fiber gain medium;
   a saturable absorber coupled to the second end of said laser cavity, for inducing modelocking of said fiber laser along either of said first and second polarization axes of said highly-birefringent fiber gain medium in the absence of any non-fiber, intra-cavity, polarization-manipulating elements; and
   an output for outputting the laser energy amplified within said laser cavity.

2. The modelocked fiber laser according to claim 1, wherein said highly-birefringent fiber gain medium includes a rare-earth-doped fiber.

3. The modelocked fiber laser according to claim 2, wherein said rare-earth-doped fiber includes at least one of: Er, Yb, Er/Yb, Nd, Pr, Ho and Tm.

4. The modelocked fiber laser according to claim 1, wherein said highly-birefringent fiber gain medium has a birefringence greater than $1.0 \times 10^{-5}$.

5. The modelocked fiber laser according to claim 1, wherein said highly-birefringent fiber gain medium has a birefringence which is due primarily to internal stresses inside said highly-birefringent fiber gain medium.

6. The modelocked fiber laser according to claim 1, wherein the polarization axis of said highly-birefringent fiber gain medium along which modelocking occurs is indeterminate prior to application of the laser energy from said pump laser.

7. The modelocked fiber laser according to claim 1, wherein said highly-birefringent fiber gain medium is bent such that a loss differential exists between said first and second polarization axes, which loss differential causes modelocking to occur along a predetermined one of said first and second polarization axes.

8. The modelocked fiber laser according to claim 7, wherein a portion of said highly-birefringent fiber gain medium is coiled with a coiling diameter between approximately 5 mm and 10 cm, and preferably between 12.5 mm and 10 cm.

9. The modelocked fiber laser according to claim 7, wherein said highly-birefringent fiber gain medium is coherently bent such that an orientation of the first and second polarization axes is controlled with respect to a bend of said highly-birefringent fiber gain medium.

10. The modelocked fiber laser according to claim 1, wherein said highly-birefringent fiber gain medium has a D-shaped cross-section or a rectangular cross-section.

11. The modelocked fiber laser according to claim 1, wherein said reflector comprises a dichroic mirror coupled to said pump laser, said dichroic mirror being at least partially transmissive at the pump wavelength such that the laser energy from said pump laser is transmitted into said laser cavity.

12. The modelocked fiber laser according to claim 11, further comprising a pigtail fiber connecting said pump laser to said dichroic mirror.

13. The modelocked fiber laser according to claim 12, wherein said output is coupled to said dichroic mirror, said dichroic mirror being partially transmissive at the signal wavelength, such that the amplified laser energy is transmitted from said laser cavity to said output.

14. The modelocked fiber laser according to claim 13, wherein said pigtail fiber receives the laser energy at the pump wavelength from said pump laser and receives the amplifier laser energy at the signal wavelength from said laser cavity via said dichroic mirror, said modelocked fiber laser further comprising a wavelength-division multiplexing (WDM) coupler coupled to said pigtail fiber and said output, for separating the amplified laser energy at the signal wavelength from the laser energy at the pump wavelength and for directing the amplified laser energy at the signal wavelength into said output fiber.

15. The modelocked fiber laser according to claim 14, wherein said pigtail fiber and said WDM coupler are polarization maintaining.

16. The modelocked fiber laser according to claim 15, wherein polarization axes of said pigtail fiber are aligned with the first and second polarization axes of said highly-birefringent fiber gain medium, such that the output of said modelocked laser is obtained along one of said first and second polarization axes.

17. The modelocked fiber laser according to claim 12, wherein said pigtail fiber is coupled to said dichroic mirror via a rotary splice.

18. The modelocked fiber laser according to claim 12, wherein said pigtail fiber is coupled to said dichroic mirror via a glued splice or a fused splice.

19. The modelocked fiber laser according to claim 1, wherein said pump laser is a single-mode laser diode.

20. The modelocked fiber laser according to claim 1, wherein said saturable absorber has a band edge within 100 nm of said signal wavelength.

21. The modelocked fiber laser according to claim 1, wherein said saturable absorber is a semiconductor saturable absorber mirror formed of InGaAsP.

22. The modelocked fiber laser according to claim 1, wherein the second end of said highly-birefringent fiber gain medium is glued to said saturable absorber mirror.

23. The modelocked fiber laser according to claim 1, wherein the second end of said highly-birefringent fiber gain medium is separated from said saturable absorber by a gap.

24. The modelocked fiber laser according to claim 23, wherein the second end of said highly-birefringent fiber gain medium is AR-coated, the modelocked fiber laser further comprising a glass capillary having a first end glued to the AR-coated second end of said highly-birefringent fiber gain medium and a second end glued to said saturable absorber.

25. The modelocked fiber laser according to claim 1, wherein the second end of said highly-birefringent fiber gain medium is attached to said saturable absorber using a lift-off technique.

26. The modelocked fiber laser according to claim 1, wherein said saturable absorber comprises at least one quantum well.

27. The modelocked fiber laser according to claim 1, further comprising an isolator coupled to said pump laser for isolating said pump laser from feedback.

28. The modelocked fiber laser according to claim 1, wherein said output fiber is coupled to said saturable absorber, said saturable absorber comprising a saturable absorber mirror which is partially transmissive at the signal wavelength, to constitute said output for the amplified laser energy.

29. The modelocked fiber laser according to claim 1, wherein said highly-birefringent fiber gain medium is a highly-birefringent double-clad fiber and said pump laser is one of a broad-area diode laser and a diode array.

30. The modelocked fiber laser according to claim 29, further comprising:
a double-clad pigtail fiber connecting said pump laser to said reflector, said reflector comprising a dichroic mirror that is at least partially transmissive at the pump wavelength such that the laser energy from said pump laser is transmitted into said laser cavity, said dichroic mirror being partially transmissive at the signal wavelength such that the amplified laser energy is transmitted from said laser cavity to said double-clad pigtail fiber; and
a wavelength-division multiplexing (WDM) coupler coupled to said double-clad pigtail fiber and said output fiber, for separating the amplified laser energy at the signal wavelength from the laser energy at the pump wavelength and for directing the amplified laser energy at the signal wavelength into said output fiber, said WDM coupler operating on a single-mode portion of said double-clad pigtail fiber.

31. The modelocked fiber laser according to claim 1, wherein said highly-birefringent fiber gain medium is coupled to said pump laser via a side-pumping mechanism.

32. The modelocked fiber laser according to claim 1, wherein said saturable absorber comprises an integrated polarizer.

33. The modelocked fiber laser according to claim 32, wherein said integrated polarizer is a wire grid formed on a surface of said saturable absorber, said wire grid being aligned with one of said first and second polarization axes of said highly-birefringent fiber gain medium, such that modelocking is induced along a predetermined one of said first and second polarization axes of said highly-birefringent fiber gain medium.

34. The modelocked fiber laser according to claim 1, wherein a polarization of the laser energy generated by said laser pump is aligned with one of said first and second polarization axes of said highly-birefringent fiber gain medium to produce a differential gain along the first and second polarization axes, which differential gain causes modelocking to occur along a predetermined one of said first and second polarization axes.

35. The modelocked fiber laser according to claim 1, further comprising a polarization-dependent feedback device external to said laser cavity, for generating a polarization-dependent feedback which induces modelocking along a predetermined one of said first and second polarization axes.

36. The modelocked fiber laser according to claim 35, wherein said polarization-dependent feedback device is one of a fiber grating and an external polarizer, in conjunction with a reflecting surface.

37. The modelocked fiber laser according to claim 1, further comprising a piezoelectric coil on which said highly-birefringent fiber gain medium is mounted, said piezoelectric coil being modulated to control an effective length of said laser cavity and to induce modelocking along a predetermined one of said first and second polarization axes of said highly-birefringent fiber gain medium.

38. The modelocked fiber laser according to claim 1, wherein said highly-birefringent fiber gain medium comprises a first optical fiber and a second optical fiber which are spliced together such that polarization axes of said first and second optical fibers are aligned either parallel or anti-parallel to one another.

39. The modelocked fiber laser according to claim 38, wherein said first optical fiber is a double-clad fiber and said second optical fiber is a highly-birefringent, dispersion-compensating fiber.

40. The modelocked fiber laser according to claim 1, wherein the second end of said highly-birefringent fiber gain medium is tapered to increase a mode-field diameter of said highly-birefringent fiber gain medium to thereby increase a damage threshold of said saturable absorber mirror.

41. The modelocked fiber laser according to claim 1, wherein the second end of said highly-birefringent fiber gain medium is separated from said saturable absorber mirror by a distance less than 10 cm.

42. The modelocked fiber laser according to claim 1, further comprising a lens assembly disposed between the second end of said highly-birefringent fiber gain medium and said saturable absorber mirror, for controlling a spot size of the amplified laser energy from said highly-birefringent fiber gain medium on said saturable absorber mirror.

43. The modelocked fiber laser according to claim 1, further comprising an intra-cavity fiber end configured to induce a polarization-dependent loss, for ensuring modelocking along a selected polarization axis.

44. The modelocked fiber laser according to claim 1, further comprising an all-fiber, intra-cavity polarizer.

45. The modelocked fiber laser according to claim 44, wherein said all-fiber, intra-cavity polarizer comprises a polished-down fiber having a metal film deposited thereon.

46. The modelocked fiber laser according to claim 1, wherein said output is coupled to a polarization maintaining fiber pigtail.

47. The modelocked fiber laser according to claim 1, wherein said output is coupled to a fiber pigtail.

48. The modelocked fiber laser according to claim 1, wherein a fiber grating is written into said highly-birefringent fiber gain medium.

49. The modelocked fiber laser according to claim 1, wherein the power of the laser energy generated by said pump laser is varied to induce passive harmonic modelocking and generation of multiple simultaneous pulses in said laser cavity.

50. A method for passively modelocking a fiber laser, comprising the steps of:
forming a laser cavity from a fiber structure having at least one highly-birefringent fiber gain medium, each said medium having first and second polarization axes, first and second ends of said fiber structure respectively defining first and second ends of the laser cavity;
pumping laser energy at a pump wavelength into the laser cavity;
inducing modelocking in the laser cavity along one of the first and second polarization axes of the highly-birefringent fiber gain medium in the absence of any non-fiber, intra-cavity, polarization-manipulating elements by coupling a reflector to the first end of the laser cavity and by coupling a saturable absorber to the second end of the laser cavity; and outputting laser energy from the laser cavity at a signal wavelength.

51. The method according to claim 50, wherein the polarization axis of the highly-birefringent fiber gain medium along which modelocking is induced is indeterminate prior to pumping the laser energy into the laser cavity.

52. The method according to claim 50, further comprising the step of:

bending the highly-birefringent fiber gain medium such that a loss differential exists between the first and second polarization axes, which loss differential causes modelocking to occur along a predetermined one of the first and second polarization axes.

53. The method according to claim 52, wherein said bending step includes coiling a portion of the highly-birefringent fiber gain medium with a coiling diameter between approximately 5 mm and 10 cm, and preferably between 12.5 mm and 10 cm.

54. The method according to claim 52, wherein said bending step includes coherently bending the highly-birefringent fiber gain medium such that an orientation of the first and second polarization axes is controlled with respect to a bend of the highly-birefringent fiber gain medium.

55. The method according to claim 50, further comprising the step of:

aligning a polarization axis of the laser energy at the pump wavelength with one of the first and second polarization axes of the highly-birefringent fiber gain medium, such that modelocking is induced along a predetermined one of the first and second polarization axes.

56. The method according to claim 50, further comprising the step of:

integrating a polarizer into the saturable absorber mirror, the polarizer being aligned with respect to the first and second polarization axes of the highly-birefringent fiber gain medium such that modelocking is induced along a predetermined one of the first and second polarization axes.

57. The method according to claim 50, further comprising the step of:

generating, external to the laser cavity, a polarization-dependent feedback which induces modelocking along a predetermined one of the first and second polarization axes of the highly-birefringent fiber gain medium.

58. The method according to claim 50, further comprising the steps of:

mounting the highly-birefringent fiber gain medium on a piezoelectric coil; and modulating the piezoelectric coil to induce modelocking along a predetermined one of the first and second polarization axes of the highly-birefringent fiber gain medium.

59. The method according to claim 50, further comprising the step of:

forming an all-fiber polarizer within the laser cavity to induce modelocking along a predetermined one of the first and second polarization axes of the highly-birefringent fiber gain medium.

60. A modelocked fiber laser, comprising:

a pump laser for generating laser energy at a pump wavelength;

a highly-birefringent fiber gain medium having first and second polarization axes, for amplifying the laser energy at a signal wavelength;

a reflector for reflecting the laser energy through said highly-birefringent fiber gain medium;

a saturable absorber for inducing modelocking of said fiber laser along either one of said first and second polarization axes of said highly-birefringent fiber gain medium in the absence of any non-fiber, intra-cavity, polarization-manipulating elements; and an output for outputting the laser energy.

61. A modelocked fiber laser, comprising:

a pump laser for generating laser energy at a pump wavelength;

a highly-birefringent fiber gain medium having first and second polarization axes, for amplifying the laser energy at a signal wavelength;

a reflector for reflecting the laser energy through said highly-birefringent fiber gain medium;

a saturable absorber for inducing modelocking of said fiber laser along either one of said first and second polarization axes of said highly-birefringent fiber gain medium; and an output for outputting the laser energy.

62. A modelocked fiber laser, comprising:

a pump laser for generating laser energy at a pump wavelength;

a highly-birefringent double-clad fiber gain medium having first and second polarization axes, for amplifying the laser energy at a signal wavelength;

a side-pumping device for coupling said pump laser to said highly-birefringent double-clad fiber gain medium;

a reflector for reflecting the laser energy through said highly-birefringent fiber gain medium;

a saturable absorber for inducing modelocking of said fiber laser along either one of said first and second polarization axes of said highly-birefringent double-clad fiber gain medium; and an output for outputting the laser energy.

63. A modelocked fiber laser, comprising:

a pump laser for generating laser energy at a pump wavelength;

a highly-birefringent fiber gain medium having first and second polarization axes and having first and second ends which respectively define first and second ends of a laser cavity for amplifying the laser energy at a signal wavelength;

a reflector coupled to the first end of said laser cavity, for reflecting the laser energy through said highly-birefringent fiber gain medium;

a saturable absorber for inducing modelocking of said fiber laser along either of said first and second polarization axes of said highly-birefringent fiber gain medium; and an output for outputting the laser energy amplified within said laser cavity.

* * * * *